United States Patent
Rollmann et al.

(10) Patent No.: US 8,548,658 B2
(45) Date of Patent: Oct. 1, 2013

(54) METHOD FOR THE FAIL-SAFE OPERATION OF A HYBRID VEHICLE FOR THE CONTROLLED INITIATION OF A SUBSTITUTE MEASURE ALLOWING AN OPERATION OF THE VEHICLE UNDER EMERGENCY CONDITIONS, AND DEVICE FOR IMPLEMENTING THIS METHOD

(75) Inventors: Ute Rollmann, Stuttgart (DE); Peter Ahner, Boeblingen (DE); Michael Bildstein, Stuttgart (DE); Michael Lehner, Wiernsheim (DE); Felix Reber, Ludwigsburg (DE); Oliver Kaefer, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 12/866,341

(22) PCT Filed: Nov. 19, 2008

(86) PCT No.: PCT/EP2008/065798
§ 371 (c)(1),
(2), (4) Date: Sep. 8, 2011

(87) PCT Pub. No.: WO2009/097923
PCT Pub. Date: Aug. 13, 2009

(65) Prior Publication Data
US 2012/0109430 A1 May 3, 2012

(30) Foreign Application Priority Data
Feb. 7, 2008 (DE) .................... 10 2008 008 207

(51) Int. Cl.
*B60L 9/00* (2006.01)

(52) U.S. Cl.
USPC ................... 701/22; 701/39; 701/41; 701/67; 701/29.1; 701/30.5; 701/31.4; 701/31.9; 280/5.501; 280/1.202; 180/65.1; 180/68.4; 290/40 C; 903/903

(58) Field of Classification Search
USPC .......................................................... 701/51
See application file for complete search history.

(56) References Cited

U.S. PATENT DOCUMENTS

| 5,938,561 A | 8/1999 | Schubert |
| 7,160,225 B2 * | 1/2007 | Berger et al. ..................... 477/5 |

(Continued)

FOREIGN PATENT DOCUMENTS

| CN | 1659054 | 8/2005 |
| DE | 19544021 | 5/1997 |

(Continued)

OTHER PUBLICATIONS

International Search Report, PCT International Patent Application No. PCT/EP2008/065798, dated Feb. 25, 2009.

*Primary Examiner* — Redhwan K Mawari
(74) *Attorney, Agent, or Firm* — Kenyon & Kenyon LLP

(57) ABSTRACT

A method for the fail-safe operation of a hybrid vehicle having an internal combustion engine, an electric motor, and additional vehicle assemblies. A substitute measure that then still allows the vehicle to be operated under emergency running conditions is initiated if a vehicle assembly fails. A performance quantity that is characteristic of the driving-dynamics situation in which the vehicle finds itself is recorded prior to initiating the substitute measure, and is compared to at least one limit value. The substitute measure is initiated if the limit value is exceeded or not attained. A device which includes a device for implementing such a method is also provided.

15 Claims, 2 Drawing Sheets

(56) References Cited

U.S. PATENT DOCUMENTS

| | | | |
|---|---|---|---|
| 2002/0036385 A1* | 3/2002 | Mackle et al. | 280/5.521 |
| 2002/0163198 A1* | 11/2002 | Gee | 290/40 C |
| 2002/0179041 A1* | 12/2002 | Schultalbers et al. | 123/299 |
| 2005/0051371 A1* | 3/2005 | Masterson | 180/65.2 |
| 2009/0139781 A1* | 6/2009 | Straubel | 180/65.1 |

FOREIGN PATENT DOCUMENTS

| | | |
|---|---|---|
| DE | 10316422 | 12/2003 |
| JP | 10073161 | 3/1998 |
| JP | 2001-165019 A | 6/2001 |
| JP | 2002-159101 | 5/2002 |
| JP | 2002 285905 | 10/2002 |
| JP | 2005-073458 A | 3/2005 |
| WO | WO 2007/088429 | 8/1997 |
| WO | WO 2008/037769 | 4/2008 |

\* cited by examiner

METHOD FOR THE FAIL-SAFE OPERATION OF A HYBRID VEHICLE FOR THE CONTROLLED INITIATION OF A SUBSTITUTE MEASURE ALLOWING AN OPERATION OF THE VEHICLE UNDER EMERGENCY CONDITIONS, AND DEVICE FOR IMPLEMENTING THIS METHOD

FIELD OF THE INVENTION

The present invention relates to a method for the fail-safe operation of a hybrid vehicle having an internal combustion engine, an electric motor and additional vehicle assemblies, in which in case of a failure of a vehicle assembly or a restriction in the operation of a vehicle assembly, a substitute measure is initiated that will then still allow an operation of the vehicle under emergency conditions. The present invention also relates to a device which includes an arrangement for implementing such a method.

BACKGROUND INFORMATION

Hybrid vehicles denote so-called micro hybrid vehicles, mild hybrid vehicles and full hybrid vehicles. Encompassed in particular are land-bound motor vehicles which are equipped with at least an internal combustion engine, i.e., an Otto engine, and/or a Diesel engine. Furthermore, such hybrid vehicles also have an electric motor.

Examples of vehicles already on the market are the BMW 1 series as a representative of a micro hybrid vehicle, the Honda Civic, as a representative of a mild hybrid vehicle, and the Toyota Prius, as a representative of a full hybrid vehicle. Other manufacturers also offer comparable hybrid vehicles.

While a micro hybrid vehicle merely features an automatic start-stop function and a function for recuperating the braking energy in order to charge a starter battery, and an electric machine is not used for driving the vehicle, in the case of a mild hybrid vehicle, an electric machine, i.e., a device which is able to be used both as generator and as motor, supports the internal combustion engine so as to increase the performance or to increase the efficiency. The performance increase is also referred to as "boosting".

As is also the case in a micro hybrid vehicle, the regeneration of braking energy, i.e., the recuperation, is able to be realized in a mild hybrid vehicle as well.

In contrast to the previously briefly explained hybrid versions, in a full hybrid vehicle, the vehicle is driven directly by the output of the electric machine.

As in any other vehicle, it may happen that a defect of a vehicle assembly, such as clutches, gears, brake devices or other mechanical or electromechanical elements, for example, arises during the operation of hybrid vehicles. Conventionally, to enable the vehicle driver to at least move the vehicle out of a danger zone such as an intersection or the highway, and/or to reach a service facility in the event of such a defect, emergency running functions are initiated through substitute measures.

German Patent Application No. DE 103 16422 A1, for example, suggests a control strategy for hybrid vehicles. Also described therein is the connection of an electric motor to an internal combustion engine, the intention being that the connection takes place without jerking.

For it must be noted that the triggering or initiation of substitute measures disadvantageously causes a torque discontinuity at the drive wheels in most cases. If the emergency running function is induced by the substitute measures in a situation in which the vehicle is in a state that is critical from the aspect of vehicle dynamics to begin with, this will endanger the vehicle because, for example, the vehicle can then break away during cornering or on a slippery roadway and thereby endanger the vehicle passengers and third parties.

SUMMARY

According to an embodiment of the present invention, prior to initiating the substitute measure, a performance quantity characteristic of the driving-dynamics situation in which the vehicle happens to be is detected and compared to at least one limit value, the substitute measure being initiated only if the limit value is exceeded or undershot.

This forestalls certain emergency running measures in states that are critical from the aspect of driving dynamics.

This increases the availability of the vehicle. In addition, the vehicle driver is at least still able to reach the nearest service facility with the defective vehicle. Even if no outside help is available, the vehicle driver is at least able to move the vehicle out of the danger zone such as an intersection or the highway, under his own power. Given the equipment of vehicles according to the present invention, the robustness of the vehicles is increased as well, which is advantageous particularly also for the manufacturers of the vehicles, because it improves the ranking of the vehicles in break-down statistics.

The present invention also relates to a device which is suitable for implementing a method according to the present invention by suitable means.

Advantageous specific developments are described in greater detail below.

For example, to detect the driving-dynamics situation, it may be advantageous if the transverse acceleration of the vehicle is detected and compared to a limit value. Typical driving states are recognized and the initiation of substitute measures for ensuring an emergency running function is prevented or at least delayed. It is therefore not necessary to forego the initiation of any type of substitute measure simply because a risk may arise in a few special driving situations.

In order to determine with greater certainty whether the particular situation in which the vehicle finds itself is critical according to driving-dynamics criteria, it may be advantageous if the vehicle speed and/or the particular steering angle are/is detected and compared to a pertinent limit value in order to detect the situation with regard to the driving dynamics. The meaningfulness is increased, which reduces the frequency at which emergency running functions are not initiated by the respective substitute measures. This further increases the availability of the vehicle.

If the performance quantity is used by a control unit and/or a driver-assistance system such as the ESP system, then the required reference variables are able to be picked off without any great additional effort, so that a reliable statement regarding the currently prevailing situation with regard to the driving dynamics may be provided. Especially when picking off the reference variable from an ESP system, the yaw rate of the vehicle or its transverse acceleration is able to be inferred reliably, so that a highly reliable conclusion may be drawn. Since ESP systems are already integrated in the majority of vehicles sold on the European market, it is particularly cost-effective to pick off the required performance quantity in an ESP system provided in a corresponding driver-assistance system. Because corresponding control units are likewise installed in most vehicles, these, too, may be utilized for supplying the required data so as to avoid the installation of additional sensors.

The torque transmittable by the internal combustion engine may then be used in addition if a first clutch disposed between the internal combustion engine and the electric motor is closed when the limit value is undershot. Thus, if insufficient electromotive output is available to drive the vehicle, then it is possible to simply connect the internal combustion engine. Charging of the storage medium for the electric motor, e.g., a battery, is also advantageously possible via the internal combustion engine due to the interconnection of the electric motor, which functions as generator as the case may be. This preserves the functionality of the entire vehicle in an advantageous manner.

Furthermore, it may be especially advantageous if a differentiation is made between substitute measures that influence the driving-dynamics situation of the vehicle, and measures that do not influence the driving dynamics situation of the vehicle.

If the differentiation is made prior to comparing the performance quantity to the limit value, then it is possible to classify the substitute measures in such a way that possibly only the substitute measures that are critical with regard to the driving dynamics are prevented. This further improves the availability of the vehicle and the possibility of at least reaching a service facility in the event of a defect.

To save resources and time, it may also be advantageous if the comparison between the performance quantity and the corresponding limit value is undertaken only if the substitute measure is identified as a factor that influences the driving-dynamics situation of the vehicle.

If a device is used which includes a device for implementing the method according to the present invention, then this may likewise increase the availability of the vehicle and allow appropriate retrofitting of vehicles.

If an electric motor is operable as generator as well, the functionality and versatility of the vehicle are increased, in particular with regard to the possibility of recuperating energy when braking.

BRIEF DESCRIPTION OF THE DRAWINGS

The present invention is explained in greater detail below with reference to exemplary embodiments.

DETAILED DESCRIPTION OF EXAMPLE EMBODIMENTS

Figure 1:
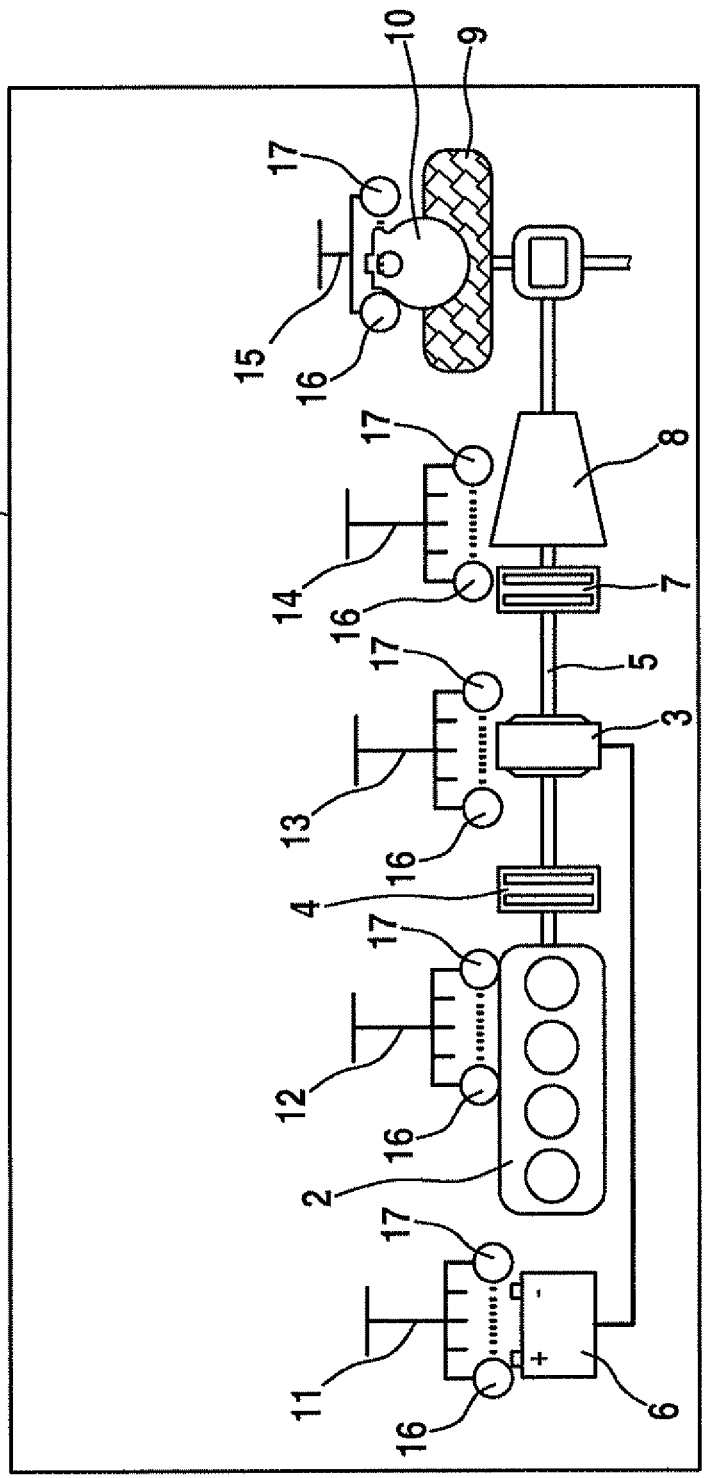
FIG. 1 shows a schematic illustration of a basic structure of a hybrid vehicle, using corresponding vehicle assemblies.

FIG. 1 shows a hybrid vehicle 1 having an internal combustion engine 2 and an electric motor 3. A first clutch 4 is disposed between internal combustion engine 2 and electric motor 3. First clutch 4 is connected to a drive shaft 5, the one end of drive shaft 5 being able to be driven by internal combustion engine 2, and a region separated therefrom by first clutch 4 being able to be driven by electric motor 3. Electric motor 3 may also be operated as generator. This case arises only if first clutch 4 transmits a torque from internal combustion engine 2 to electric motor 3 via drive shaft 5.

In such a case electric motor 3, acting as generator, generates electrical energy and charges a battery 6.

During normal electric operation, battery 6 supplies the energy required to operate electric motor 3, i.e., at least in cases where internal combustion engine 2 is not driven. First clutch 4 is usually not closed in such a case. However, first clutch 4 is able to be closed even in a case such as this, as explained above.

The torque applied at the end of drive shaft 5 facing away from the internal combustion engine is forwarded to a gearing 8 via a further clutch 7. The usually transformed torque is then transmitted to drive wheels 9, of which one is illustrated. The torque applied at drive wheels 9 leads to locomotion of hybrid vehicle 1 relative to an immovable reference point.

Brake devices 10 are disposed at the wheels, in particular drive wheels 9. A battery control unit 11 is mounted on battery 6.

Corresponding control units are also provided for internal combustion engine 2, electric motor 3, gearing 8, and brake device 10. For example, an internal combustion engine control unit 12, an electric motor control unit 13, a gearing control unit 14, and a brake device control unit 15 are provided. Each control unit has an actuator and a sensor. The actuator is denoted by reference numeral 16, and the sensor by reference numeral 17 in each case.

The hybrid vehicle may assume different switching and method states.

One of the normal cases is that first clutch 4 is closed in order to start internal combustion engine 2.

When internal combustion engine 2 is running, it is also possible to drive drive shaft 5 beyond the capacity of internal combustion engine 2 for a brief period of time, utilizing the torque provided by electric motor 3, that is to say, achieve "boosting".

If a defect of a partial assembly occurs, e.g., a hydraulic actuator, then this gives rise to the special case in which first clutch 4 closes, albeit unintentionally. In addition, a driving state may occur in which air is contained in the hydraulic system, which leads to incomplete opening of first clutch 4. If this is sensed by a corresponding diagnosis with the aid of a sensor system, in particular while comparing the rotational speeds of the internal combustion engine and the electric motor, then first clutch 4 is closed in order to establish an emergency running function by a corresponding substitute measure, in an effort to prevent the clutch components from rubbing against each other and to avoid excessive wear. However, both of these actions, i.e., the closing of first clutch 4, lead to an abrupt change in torque. This stems also from the mass inertia of the internal combustion engine.

In order to avoid closing of clutch 4 in a critical driving situation, and despite the fact that this would prevent wear of the no longer properly closing first clutch, prior to implementing the substitute measure (closing of first clutch 4) to achieve the emergency running function, it is evaluated whether a critical situation is at hand with regard to driving dynamics. Toward this end, the transverse acceleration of the vehicle is determined, and the initiation of the critical substitute measure is prevented or delayed if appropriate, as a function of possibly additional performance quantities such as the vehicle speed and steering angle.

Electric motor 3, which also functions as electric machine as explained, is brought into an active short-circuit in another substitute measure that covers an emergency running function.

In an unsuitable situation, however, the example method according to the present invention and a corresponding device prevent electric motor 3 from introducing a torque into drive shaft 5 that is harmful to the particular driving situation at hand.

Skidding of the vehicle or a breakaway of the vehicle is avoided.

Figure 2:
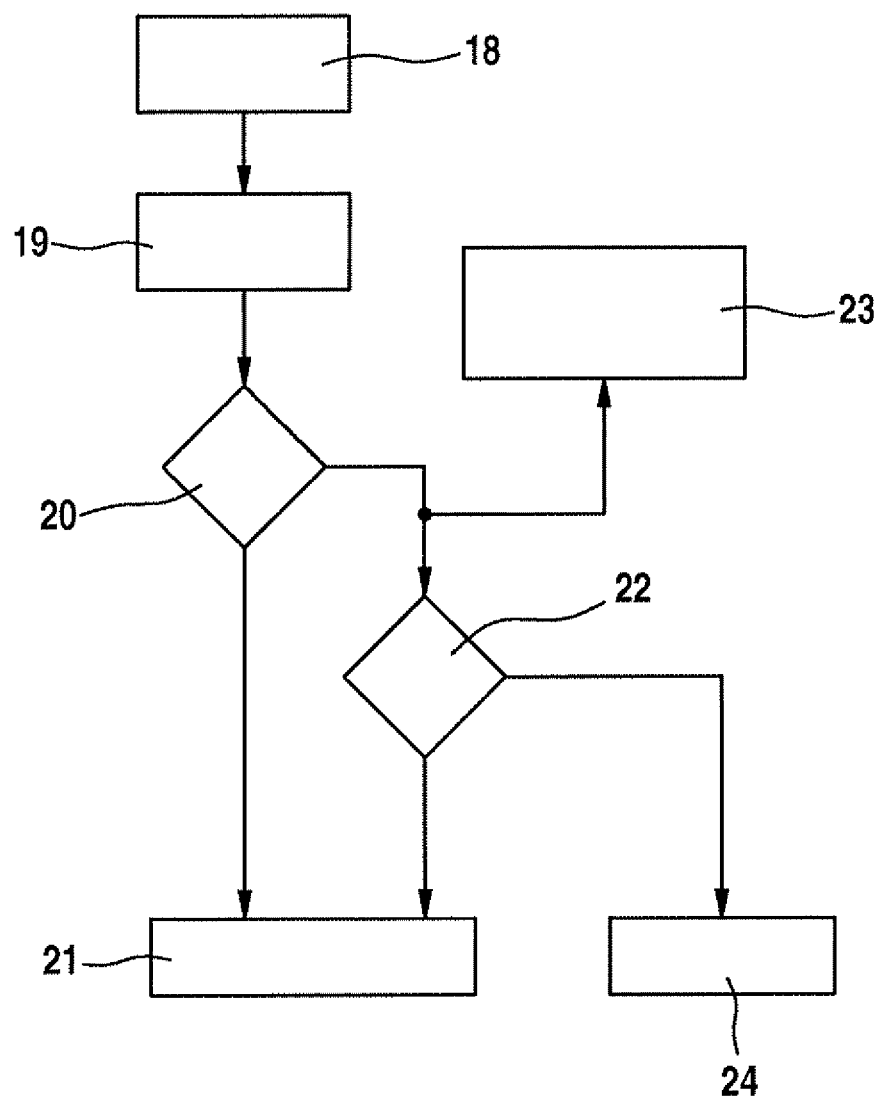
FIG. 2 shows a schematic diagram to illustrate example method steps.

FIG. 2 illustrates a flow chart in schematic form.

In a first step 18, using a diagnosis function, a defect on the vehicle that is able to be remedied by initiating a substitute measure is detected. In a following step 19, the substitute measure to be initiated is determined. Step 18 and step 19 are able to be performed in a corresponding computing device.

In a third, subsequent step 20, it is checked whether the substitute measure should be regarded as critical for the particular driving-dynamics situation. Thus, a classification is queried in this step as to whether the corresponding substitute measure entails effects that are relevant in terms of driving dynamics. If the substitute response to be implemented is non-critical with regard to driving dynamics, the substitute measure is initiated in a subsequent step 21.

However, if the check in step 20 reveals that the substitute measure to be implemented does have an effect on the driving-dynamics situation which will have negative consequences, that is to say, if the substitute measure is classified as being critical for the driving dynamics, then a characteristic performance quantity is compared to corresponding limit values in a separate test step 22.

The limit values are threshold values either set by the vehicle driver or values preset for the vehicle. The corresponding performance quantities are determined in a prior step 23.

In this step, a continuous determination of the performance quantities that are characteristic of the particular driving situation takes place.

For example, the transverse acceleration, the vehicle speed, the vehicle acceleration, the steering angle or similar variables are determined. The transverse acceleration is determined by an ESP system, for instance. The transverse acceleration, as well, is able to be picked off by corresponding sensors of the brake system, e.g., by sensor 16 of brake device control unit 15.

If the corresponding performance quantity lies above the threshold value, then the substitute measure will not be initiated by a step 24. If the corresponding characteristic performance quantity lies below the individual limit value, then the substitute measure providing emergency running will be initiated, i.e., in step 21.

The comparing of the characteristic performance quantities such as the transverse acceleration, the vehicle speed, the vehicle acceleration, and the steering angle, takes place in step 22, separately or in combination.

It may be specified whether the exceeding of a threshold value or a plurality of threshold values will lead to step 24, i.e., the non-initiation of substitute measures.

What is claimed is:

1. A method for a fail-safe operation of a hybrid vehicle having an internal combustion engine, an electric motor, and additional vehicle assemblies, the method comprising:
   recording a performance quantity that is characteristic of a driving-dynamics situation in which the vehicle is in prior to initiation of a substitute measure;
   detecting a failure or operational restriction of a vehicle assembly;
   identifying the substitute measure;
   determining whether the identified substitute measure affects the driving-dynamics situation;
   subsequent to the determining, comparing the recorded performance quantity to at least one limit value; and
   determining whether to initiate the substitute measure based on the comparing, wherein the substitute measure is initiated to allow operation of the vehicle under emergency conditions if the recorded performance value is below the limit value, and is prevented if the recorded performance value is above the limit value.

2. The method as recited in claim 1, wherein the performance quantity is a transverse acceleration of the vehicle.

3. The method as recited in claim 1, wherein the performance quantity is at least one of a driving speed and a particular steering angle.

4. The method as recited in claim 1, wherein the performance quantity is utilized by at least one of a control unit and a driver-assistance system.

5. The method as recited in claim 1, wherein the performance quantity is utilized by an ESP system.

6. The method as recited in claim 1, wherein a first clutch situated between the internal combustion engine and the electric motor is closed if the limit value is not attained.

7. The method as recited in claim 1, wherein the comparison is performed conditional upon that the substitute measure is identified as influencing the driving-dynamics situation of the vehicle.

8. A vehicle control device, comprising:
   an arrangement for a fail-safe operation of a hybrid vehicle having an internal combustion engine, an electric motor, and additional vehicle assemblies, the arrangement adapted to:
      record a performance quantity that is characteristic of a driving-dynamics situation in which the vehicle is in prior to initiation of a substitute measure;
      detect a failure or operational restriction of a vehicle assembly;
      identify the substitute measure;
      determine whether the identified substitute measure affects the driving-dynamics situation;
      subsequent to the determination, compare the recorded performance quantity to at least one limit value; and
      based on the comparison:
         initiate the substitute measure, to allow operation of the vehicle under emergency conditions, if the recorded performance value is below the limit value; and
         prevent initiation of the substitute measure if the recorded performance value is above the limit value.

9. The device as recited in claim 8, wherein the electric motor is also operable as generator.

10. The vehicle control device as recited in claim 8, wherein the performance quantity is a transverse acceleration of the vehicle.

11. The vehicle control device as recited in claim 8, wherein the performance quantity is at least one of a driving speed and a particular steering angle.

12. The vehicle control device as recited in claim 8, wherein the performance quantity is utilized by at least one of a control unit and a driver-assistance system.

13. The vehicle control device as recited in claim 8, wherein the performance quantity is utilized by an ESP system.

14. The vehicle control device as recited in claim 8, wherein a first clutch situated between the internal combustion engine and the electric motor is closed if the limit value is not attained.

15. The vehicle control device as recited in claim 8, wherein the comparison is performed conditional upon that the substitute measure is identified as influencing the driving-dynamics situation of the vehicle.

* * * * *

UNITED STATES PATENT AND TRADEMARK OFFICE
CERTIFICATE OF CORRECTION

PATENT NO.       : 8,548,658 B2                                    Page 1 of 1
APPLICATION NO. : 12/866341
DATED            : October 1, 2013
INVENTOR(S)      : Rollmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this

Fifteenth Day of September, 2015

Michelle K. Lee
*Director of the United States Patent and Trademark Office*